United States Patent Office 3,184,218
Patented May 18, 1965

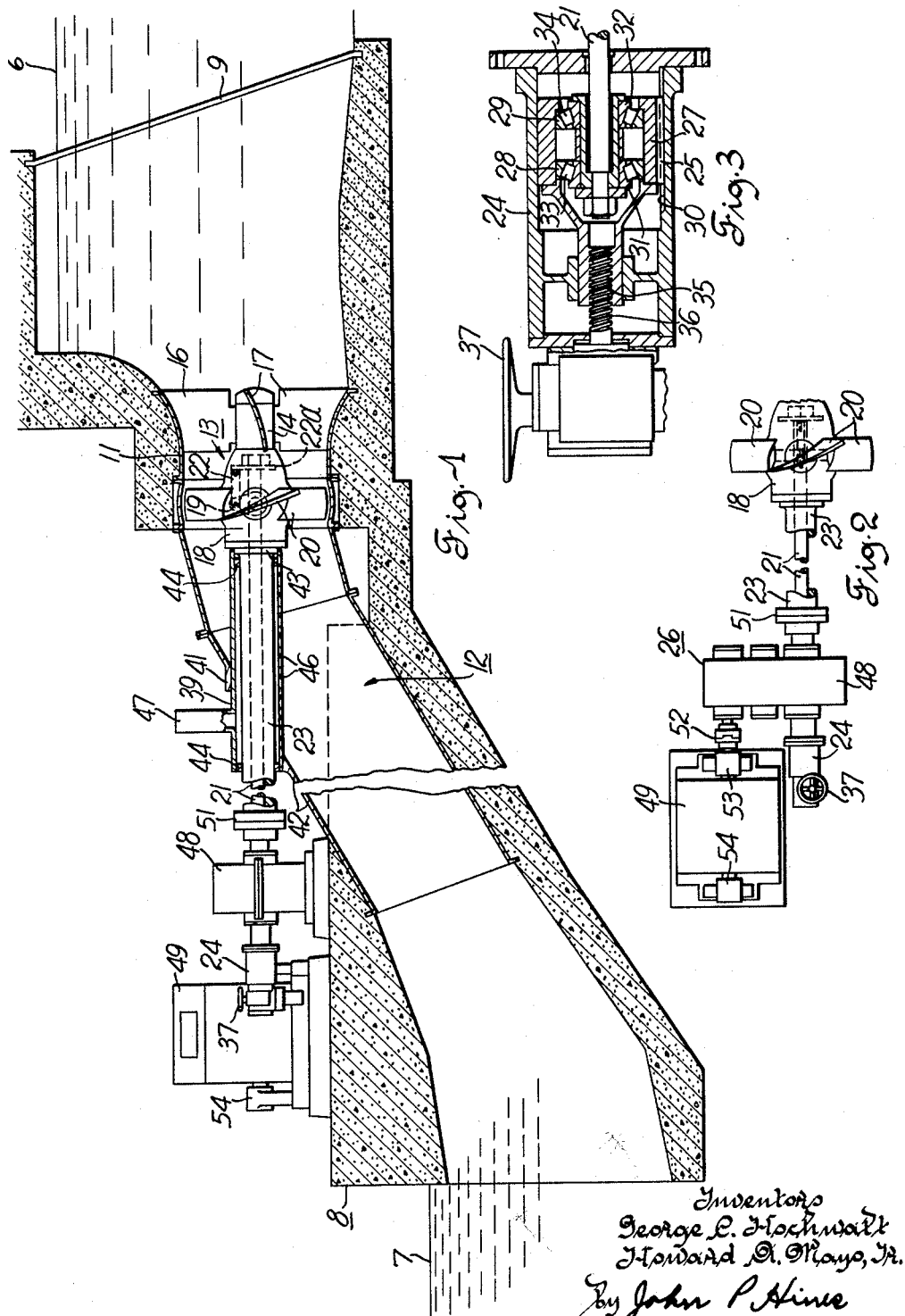

3,184,218
HYDRAULIC POWER INSTALLATION
George C. Hochwalt and Howard A. Mayo, Jr., York, Pa., assignors to Allis-Chalmers Manufacturing Company, Milwaukee, Wis.
Filed Jan. 3, 1963, Ser. No. 249,145
3 Claims. (Cl. 253—31)

This invention pertains to a hydraulic power installation and more particularly to an economical hydraulic power installation for a low head water site.

In the conventional type of hydraulic power installation, a water confining passageway is constructed with at least a section thereof disposed in a vertical plane and with a turbine runner rotatably supported in the vertical section. A vertically disposed drive shaft rotatably connected to the turbine runner conventionally extends upwardly and is drivingly connected to a generator for the production of electrical power.

Although a power installation site is selected to take advantage of any natural waterfall, it is usually necessary to perform considerable and expensive excavation in order to adapt the site to accept the vertically disposed turbine runner. When large quantities of electrical power are required and the heads are reasonably high, such costly excavation may be warranted. However, in many instances the head is low, therefore, the quantity of power that can be produced is relatively small and the expense of the large amount of excavation may well preclude the installation of the conventional type of power station.

It is the intention of applicants and the general object of the subject invention to provide a hydraulic power installation arrangement wherein low head water sites can be economically employed to produce electrical power without resorting to extensive and expensive excavation.

A more specific object of the subject invention is to provide a hydraulic power installation wherein the turbine runner is disposed in substantially a horizontally directed position.

A further object of the subject invention is to provide a horizontally disposed turbine runner for a hydraulic installation wherein the electrical machinery driven by said runner is positioned without the water passage and in downstream relation to the runner.

An additional object of the subject invention is to provide a hydraulic power installation of the hereinbefore described type wherein the turbine blades are adjustable so that they can most efficiently utilize the varying water volume and varying water head of the installation.

Another object of the subject invention is to provide a hydraulic power installation wherein a shaft alley provides means for admitting and distributing air downstream of the turbine runner as may be necessary to stabilize operation, reduce vibration or noise and provide aeration to improve dissolved oxygen content of water discharged.

A further object of the subject invention is to provide a hydraulic power installation wherein the power generating equipment is positioned without the water passage and in downstream relation to the turbine runner and is furthermore positioned above the level of the runner so that a portion of the hydraulic thrust on the turbine runner is counteracted by the axial weight component of the electrical generating equipment and other rotating components.

These and other objects of the subject invention will become more fully apparent as the following description is read in light of the attached drawings, wherein:

FIG. 1 is a cross section of a hydraulic power installation constructed in accordance with the invention;

FIG. 2 is a reduced plan view of the power train elements of FIG. 1;

FIG. 3 is a partial cross section of one form of blade actuating means; and

Figure 4:
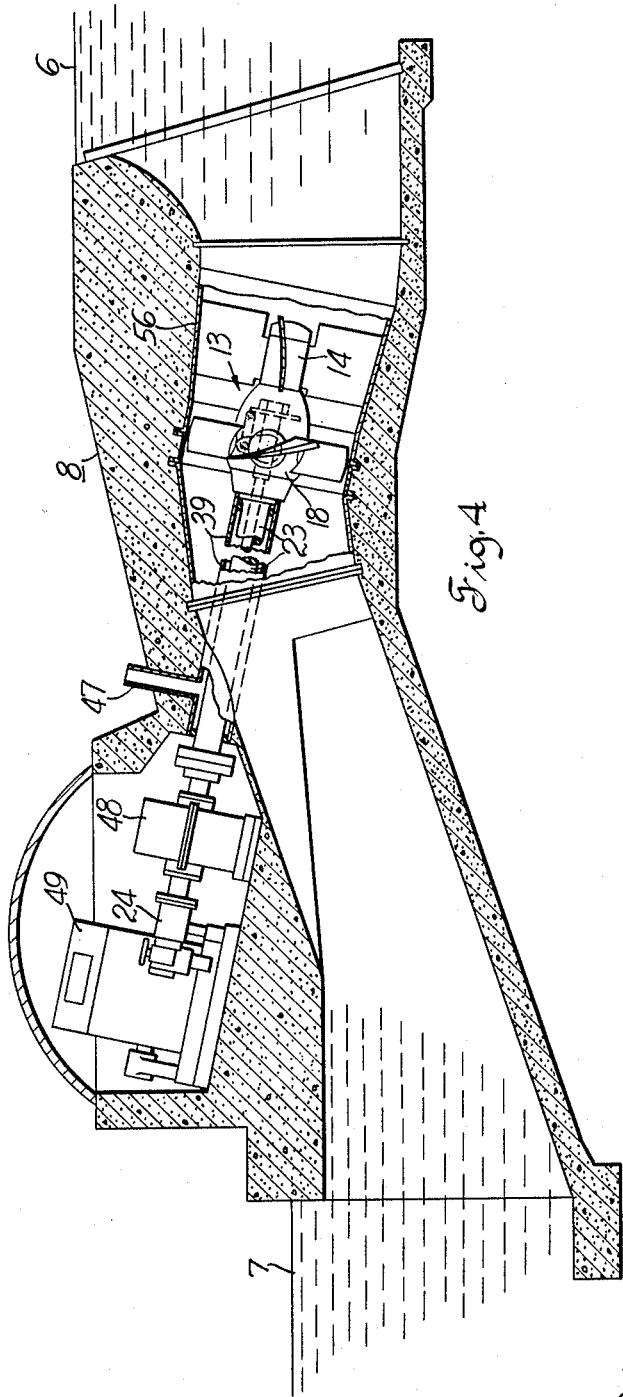
FIG. 4 is a modified form of the hydraulic power installation disclosed in FIG. 1.

Referring to FIG. 1, the hydraulic power installation is of functional necessity constructed on a site where the inlet water level as at 6 is above the level of the water at 7. Between these two water levels one or more water confining passageways are constructed and usually supported in a foundation most conventionally constructed of concrete generally designated 8. At the entrance to the water confining passages it is conventional and desirable to provide a rack 9 to block the flow of debris from entering the passageway and causing damage to the turbine runner.

In accordance with the present invention, a section 11 of a water confining passageway 12 is horizontally disposed and in this section 11 a turbine runner generally designated 13 is rotatably supported. The runner may be supported in any conventional manner and is herein shown as journaled in a bearing 14 supported in the water confining passageway 12 by means of vertically and horizontally disposed ribs 16 and 17, respectively.

In the particular arrangement shown herein for purposes of illustration, the turbine runner 13 has four blades 20 pivotally connected to a hub portion 18 in any conventional manner. The hub portion 18 of the turbine runner contains the blade adjusting mechanism. Each blade has a lever arm 19 rigidly connected thereto. Each lever arm is connected to an axially reciprocal rod 21 by means of a connecting link 22 and cross head 22a. This rod 21 extends through a hollow drive shaft 23 and is connected to blade actuating means 24 which is activated to adjust the position of the blades. A more complete description of the adjusting mechanism can be found in U.S. Patent 2,840,344, issued to E. E. Stage, June 24, 1958.

Since the rod 21 both rotates and reciprocates, it is necessary to provide a thrust bearing connection between the rod 21 and the blade actuating means 24. This can be accomplished in any number of ways and one particular example shown for purposes of illustration is disclosed in FIG. 3. Hollow shaft 23 terminates in a speed increaser generally designated 26. Speed increaser 26 contains its own guide and thrust bearings as conventionally required. The rod 21 extends past the end of hollow shaft 23 and is connected to a reciprocating cylindrical member 27. The member 27 is held from rotation by a key and key slot 25 and 30, respectively. The member 27 is provided with outer thrust bearing races 28 and 29. The end of rod 21 is provided with inner thrust bearing races 31 and 32. Positioned between these two races are a plurality of tapered rollers 33 and 34. With this arrangement reciprocating movement of the nonrotating cylindrical member 27 can be transmitted to the rotating rod 21.

Reciprocation of the member 27 can be accomplished in many ways and the method shown herein is only by way of illustration. To this end a threaded shaft 36 may be contained in a threaded orifice 35 in the member 27. A hand wheel 37 may be connected to a conventional worm wheel (not shown) to impart rotation to the screw 36. With the screw held from lineal movement, rotation thereof will cause the cylindrical member 27 and hence the rod 21 to move in an axial direction to adjust the position of the runner blades.

A horizontally disposed shaft alley 39 may be connected to the water passageway 12 in any conventional manner and is herein shown, for purposes of illustration, having one end supported in a flange 41 constructed as an integral part of a declining section 42 of the passageway 12. The other end of the shaft alley 39 is supported on a cylindrical portion 43 of the turbine runner 13. The shaft alley is in alignment with the rotating axis of the runner 13 and the drive shaft 23 extends through the shaft alley for connection to the driven machinery. Any conventional type of liquid rotary shaft seal, such as shaft packing 44, may be provided between both ends of the shaft alley and the drive shaft to seal the water passage 12 from the interior of the shaft alley.

A plurality of air openings 46 are provided on the downstream side of the shaft alley 39. An air inlet 47 may be supported on the flange 41 and be connected in air communication with the interior of the shaft alley 39 between the shaft packings 44. Air admitted through the inlet 47 passes through the openings 46 into the water passageway 12. If necessary, a pressurized air source (not shown) may be provided to supply the required volume of air. Since the shaft alley 39 passes through the water passageway 12, the natural flow of water about the shaft alley will create a low pressure pocket on the downstream surface thereof. With the openings 46 provided on this downstream surface, air will be drawn into the low pressure pocket from the atmosphere and in many applications a pressurized air source will not be required because of the large surface area of the air pocket which is in contact with the flowing water in the passageway. However, in the event additional air is required, the pressure thereof will not have to be so high as it would be if the air were forced directly into the water.

Part of the hydraulic installation foundation 8 on the downstream side of the turbine runner 13 is utilized as a support for the driven machinery which is shown herein as including a speed changer 48 and a generator or rotary machine 49. A conventional shaft coupling 51 connects the input shaft of the speed changer 48 to the drive shaft 23 of the turbine and an additional shaft coupling 52 connects the output shaft of the speed changer to the generator 49. Conventional journal bearings 53 and 54 may be provided on the near and remote sides of the generator 49.

With this arrangement, it can be seen that considerably less excavation is necessary than would be required if the turbine runner axis were in a vertical position. Furthermore, the thrust bearing arrangement for a horizontally disposed turbine is considerably less expensive and complicated than that required for a vertically disposed turbine since in the vertical arrangement the weight of the generator rotor and other rotating components are axially directed and add to the hydraulic thrust of the water acting on the turbine runner. With this arrangement and by including the adjustable runner blades, it is possible to utilize a low head water site to produce electrical power in an economical manner.

Referring now to FIG. 4, a modified form of the invention is shown. Since the installation is substantially similar to that shown in FIG. 1, identical reference characters have been used where they are appropriate. Only that portion of FIG. 4 which substantially differs from the modification disclosed in FIG. 1 will be herein described.

The modification disclosed in FIG. 4 has two obvious advantages over that described in FIG. 1. One advantage is that it may be employed on a site wherein the water head is so low it would be difficult to mount the generating equipment out of the water path without resorting to considerable excavation downstream of the turbine runner. The other obvious advantage is due to the relative level of the turbine runner and the generating equipment. With this arrangement the thrust caused by the water acting on the turbine blades is partially overcome or balanced by the axial weight component of the aligned rotating elements of the generating equipment.

In the modified view shown in FIG. 4, the runner drive shaft 23 extends at an inclined angle with the horizontal in a downstream direction. With such an arrangement, it is necessary to provide a section 56 of the water confining passageway which also is disposed at an inclined angle. The drive shaft 23 extends through an opening in the foundation 8 and is connected to the speed increaser in the manner explained in regard to FIG. 1. Because a portion of the vertical weight components of the speed increaser 48 and the turbine runner 13 combine to resist the downstream thrust of the water acting on the runner, the thrust bearing for the drive shaft may be of a lighter and less expensive construction than that used in the arrangement shown in FIG. 1. The bearing arrangement would obviously be considerably less expensive than the thrust bearing required in a vertically disposed hydraulic turbine runner.

From the above description it can be seen that the two modifications described provide an inexpensive hydraulic power installation for a low head water site which overcomes the necessity of extensive excavation necessary when the turbine is vertically disposed. With these arrangements, it is possible to utilize water power for the production of electrical power in many instances where it was heretofore prohibitively expensive.

Although only two modifications of the subject invention have been herein shown and described, it will be obvious to those skilled in the art that various modifications are suggested and it is intended to include in this invention all such modifications as come within a reasonable interpretation of the claims appended hereto.

Having now particularly described and ascertained the nature of our said invention and the manner in which it is to be performed, we declare that what we claim is:

1. In a high power installation comprising a water confining passage having an upstream end at a higher level than the downstream end and including an upper surface portion, a turbine runner rotatably supported in the upstream end of said passage, a substantially horizontal shaft having an upstream end connected to said turbine runner and an opposite downstream end passing through said upper surface portion of the water confining passage, a cylindrical hollow shaft alley surrounding the runner shaft in spaced sealing relation therewith at opposite ends of said shaft, said shaft alley being supported in said upper surface portion of the water confining passage adjacent the downstream end of said shaft, said alley having an upstream surface upon which the flowing fluid impinges, and a downstream surface about which a low pressure pocket occurs, a plurality of apertures in said downstream surface providing communication between the interior of said alley and said low pressure pocket, means communicating with said interior of said alley and the adjacent atmosphere whereby atmosphere air can be drawn into said pocket, and a rotary machine supported above the level of said downstream end of said passage, in downstream relation to said runner and without said passage, said machine being connected in driven relation to said downstream end of said shaft.

2. In a high power installation comprising an inclined water confining passage having an upstream end at a higher level than the downstream end and including an upper surface portion, a turbine runner rotatably supported in an upstream end of said pasage, a shaft having an upstream end connected to said turbine runner and an opposite downstream end passing through said upper surface portion of the water confining passage, said shaft being inclined so that said downstream end is at a higher level than said upstream end, a cylindrical hollow shaft alley surrounding the runner shaft in spaced sealing relation therewith at opposite ends of said shaft, said alley being supported in said upper surface portion of the water confining passage adjacent the downstream end of said shaft, said alley having an upstream surface upon which the flowing fluid impinges, and a downstream surface about which a low pressure pocket occurs, a plurality of apertures in said downstream surface providing communication between the interior of said alley and said low pressure pocket, means communicating with said interior of said alley and the adjacent atmosphere whereby atmosphere air can be drawn into said pocket, and a rotary machine supported above to the level of said downstream end of said passage, in downstream relation to said runner and without said passage, said machine being connected in driven relation to said downstream end of said shaft.

3. In a high power installation comprising an inclined downwardly axially extending water confining passage including an upper surface portion, the upstream end of said passage being the higher end and the downstream end being the lower end, a bladed turbine runner rotatably supported in said upstream end, a shaft supporting said turbine runner on an axis of rotation inclined upwardly above a horizontal plane, said shaft extending in a downstream direction through said upper surface portion of said downwardly axially extending water confining passage, and a machine having an inclined base supporting surface above the lower end of said water confining passage and substantially parallel to the axis of said shaft and connected to said downstream end of said shaft for rotation by said turbine runner on fluid flow therethrough, said turbine runner on the rotation thereof producing an axial thrust on said shaft in a downstream direction, the mass of the aforesaid machine cooperating with said inclined surface to counteract said downstream axial thrust of the rotating runner whereby the thrust bearing employed in the high powered installation may be materially reduced in size.

References Cited by the Examiner

UNITED STATES PATENTS

| 1,671,083 | 5/28 | Nagler | 253—141 |
| 1,978,809 | 10/34 | Moody | 253—117 |
| 2,079,258 | 5/37 | Kerr | 253—117 |
| 2,840,344 | 6/58 | Stage | 253—143 |

FOREIGN PATENTS

| 164,979 | 1/50 | Austria. |
| 1,051,731 | 9/53 | France. |

OTHER REFERENCES

German printed application No. 1,125,363, March 8, 1962.

KARL J. ALBRECHT, *Primary Examiner.*

JOSEPH H. BRANSON, JR., *Examiner.*